(12) United States Patent
Weast

(10) Patent No.: US 6,931,151 B2
(45) Date of Patent: Aug. 16, 2005

(54) METHOD AND APPARATUS FOR MODIFYING GRAPHICS CONTENT PRIOR TO DISPLAY FOR COLOR BLIND USE

(75) Inventor: John C. Weast, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 09/991,629

(22) Filed: Nov. 21, 2001

(65) Prior Publication Data

US 2003/0095705 A1 May 22, 2003

(51) Int. Cl.[7] .................................................. B06K 9/00
(52) U.S. Cl. ....................... 382/162; 382/167; 345/589
(58) Field of Search ................................ 382/114, 162, 382/165, 167, 274; 345/418, 589, 593, 594, 619, 629, 771

(56) References Cited

U.S. PATENT DOCUMENTS

| | | | | | |
|---|---|---|---|---|---|
| 5,521,615 | A | * | 5/1996 | Boyan | 345/594 |
| 5,589,898 | A | * | 12/1996 | Atkinson | 351/237 |
| 6,591,008 | B1 | * | 7/2003 | Surve et al. | 382/162 |
| 6,624,828 | B1 | * | 9/2003 | Dresevic et al. | 345/771 |

* cited by examiner

*Primary Examiner*—Phuoc Tran
(74) *Attorney, Agent, or Firm*—Blakely, Sokoloff, Taylor and Zafman

(57) ABSTRACT

Embodiments of the present invention provide a method and apparatus for dynamically modifying computer graphics content for colors and/or patterns that are problematic for color-blind viewers prior to display. In particular, graphics content may be modified in various stages of the graphics pipeline, including but not limited to, the render or raster stage, such that images provided to the user are visible to color-blind viewers upon display without further modification.

39 Claims, 6 Drawing Sheets

10

400

402

404

METHOD AND APPARATUS FOR MODIFYING GRAPHICS CONTENT PRIOR TO DISPLAY FOR COLOR BLIND USE

BACKGROUND

1. Field

The present invention relates generally to color blind systems and more particularly to filtering graphics to enable color-blind viewing.

2. Background Information

Computer graphics systems are commonly used for displaying graphical representations of objects on a two-dimensional video display screen. Current computer graphics systems provide highly detailed representations and are used in a variety of applications. Such systems typically come pre-installed with a plethora of accessibility tools for people with disabilities. Yet, providing color corrected graphics for people who suffer from color blindness still remains a challenge.

More than 20 million Americans, many of them computer users, experience some form of color blindness, which is the inability to distinguish certain colors. When light enters the eye, it passes through several structures before striking the light sensitive receptors in the retina at the back of the eye. These receptors are called rods and cones. Rod are responsible for night vision, and cones are responsible for color vision, functioning best under daylight conditions.

Each of the three types of cones, red cones, blue cones and green cones, has a different range of light sensitivity. In an individual with normal color vision, the cone population consists of approximately 74 percent red cones, 10 percent green cones and 16 percent blue cones. The stimulation of cones in various combinations accounts for the perception of colors. For example, the perception of yellow results from a combination of inputs from green and red cones, and relatively little input from blue cones. If all three cones are stimulated, white is perceived as the color. Defects in color vision occur when one of the three-cone cell coding structures fails to function properly. One of the visual pigments may be functioning abnormally, or it may be absent altogether. Most color-deficient individuals have varieties of red or green deficiency.

Since most color-blind people see black and white accurately, color is not an issue if images are in grayscale. However, most applications and web sites are heavily color reliant. Color is a particular problem with image maps in which clickable areas are delineated by color. Application and website designers have attempted to address this problem by enhancing areas by placing underlined text or a black outline in the image. Another technique is to place colors against an appropriate background where they can be more visible. Furthermore, considering that most color-blind people have a red-green color blindness, limiting using red and green together is another option. However, this limits the palette of acceptable colors. Consequently, very few application and web developers are willing to sacrifice having a flashier site to accommodate color-blind users.

What is needed therefore is a method, apparatus and system for providing color corrected graphics for color-blind users.

DETAILED DESCRIPTION

Figure 1:
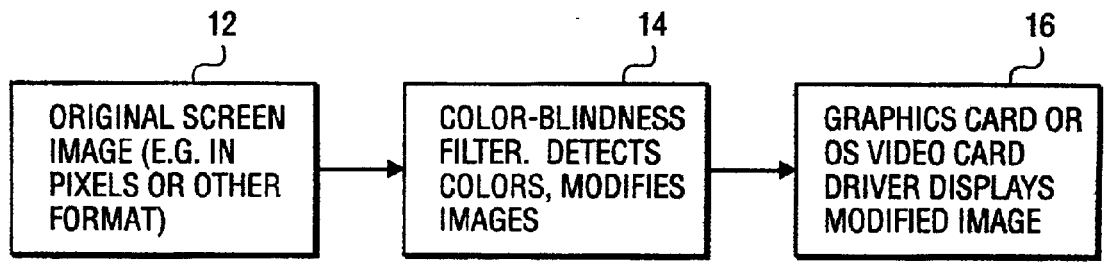
FIG. 1 illustrates a block diagram of an embodiment for providing color corrected graphics for color-blind users.

FIG. 1 illustrates a block diagram of an embodiment 10 for providing color corrected graphics for color-blind users. Embodiments of the present invention provide a method and apparatus for dynamically modifying computer graphics content for colors and/or patterns that are problematic for visually challenged, in particular color-blind viewers, prior to display. In particular, graphics content may be modified in various stages of the graphics pipeline, including but not limited to, the render or raster stage, such that images provided to the user are visible to color-blind viewers upon display without further modification. As illustrated and discussed in detail below, embodiments of the present invention may be implemented in hardware, software or a combination thereof.

In particular, referring to FIG. 1, graphics content 12 in the form of an original screen image (e.g. in pixels or other format) is provided to the color-blind filter 14 of the present invention. The color-blind filter 14 detects colors and modifies images. In particular, the color-blind filter analyzes computer graphics content in accordance with predefined color profiles that identify which graphics may be problematic for color challenged users. It then modifies problematic graphics content that falls within at least one of the pre-defined color profiles such that the graphics content is visible to color challenged users. Display technology 16, such as a graphics card or operating system video card driver displays the modified image.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 2:
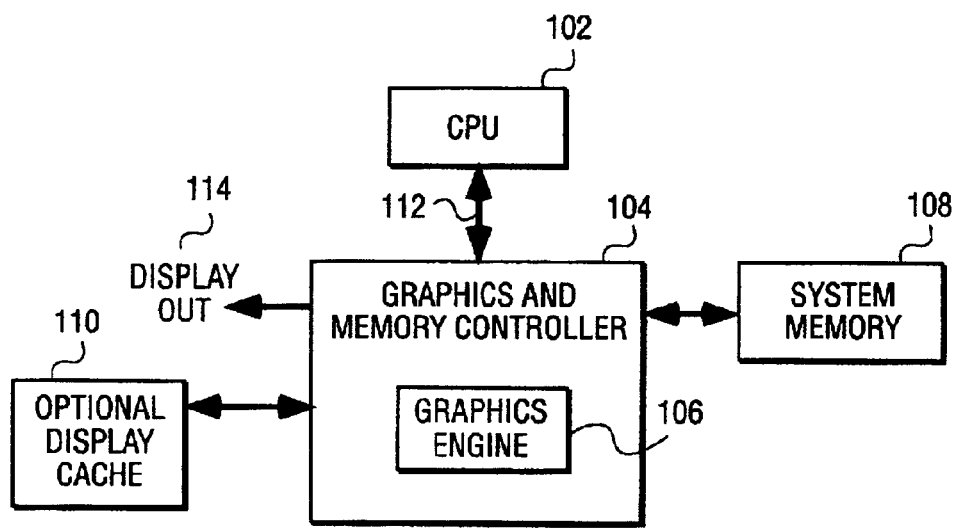
FIG. 2 illustrates a block diagram of an embodiment of a computer graphics system for implementing color corrected graphics for color-blind users.

An example of one such type of processing system is shown in FIG. 2. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.™ operating system available from Microsoft Corporation, although other operating systems and graphical user interfaces, for example, may also be used.

FIG. 2 illustrates a block diagram of an embodiment of a computer graphics system for implementing color corrected graphics for color-blind users. The computer system 100 includes central processor 102, graphics and memory controller 104 including graphics engine 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 2 is for illustrative purposes only. The present invention can also be utilized in a discrete graphics configuration. The present invention can also be utilized in a discrete or other graphics configuration.

Processor 102 issues signals over common bus 112 for communicating with memory 108 or graphics and memory controller in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics engine 106 or some other device. The instructions and/or data may comprise code for performing any and/or all of the techniques of the present invention. Memory 108 may also contain software and/or data. An optional cache memory 110 may be used to speed up memory accesses by the graphics engine 106 by taking advantage of its locality of access. One skilled in the art will recognize that the cache memory 110 can reside internal or external to the processor 102 or graphics engine 106.

In some embodiments, graphics engine 106 can offload from processor 102 many of the memory-intensive tasks required for rendering an image. Graphics engine 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics engine 106 may be coupled to common bus 112 that transmits data signals between graphics engine 106 and other components in the system 100, including display cache 110 and display device 114. Graphics engine 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104 for displaying images rendered or otherwise processed to a user. Display device 114 may comprise a computer monitor, television set, flat panel display or other suitable display device.

Memory 108 stores a host operating system that includes one or more rendering programs to build the images of graphics primitives for display. In particular, the method for providing color corrected graphics content to color-blind users may be stored in memory 108. The graphics primitives produced are laid out or rendered in the buffer memory for display on display device 114. System 100 includes graphics engine 106, such as a graphics accelerator that uses customized hardware logic device or a co-processor 104 to improve the performance of rendering at least some portion of the graphics primitives otherwise handled by host rendering programs. The graphics engine 106 is controlled by the host operating system program and its host graphics application program interface (API) through a driver program. The graphics primitives produced thereby are laid out or rendered in the buffer memory for display on display device 114.

Figure 3:
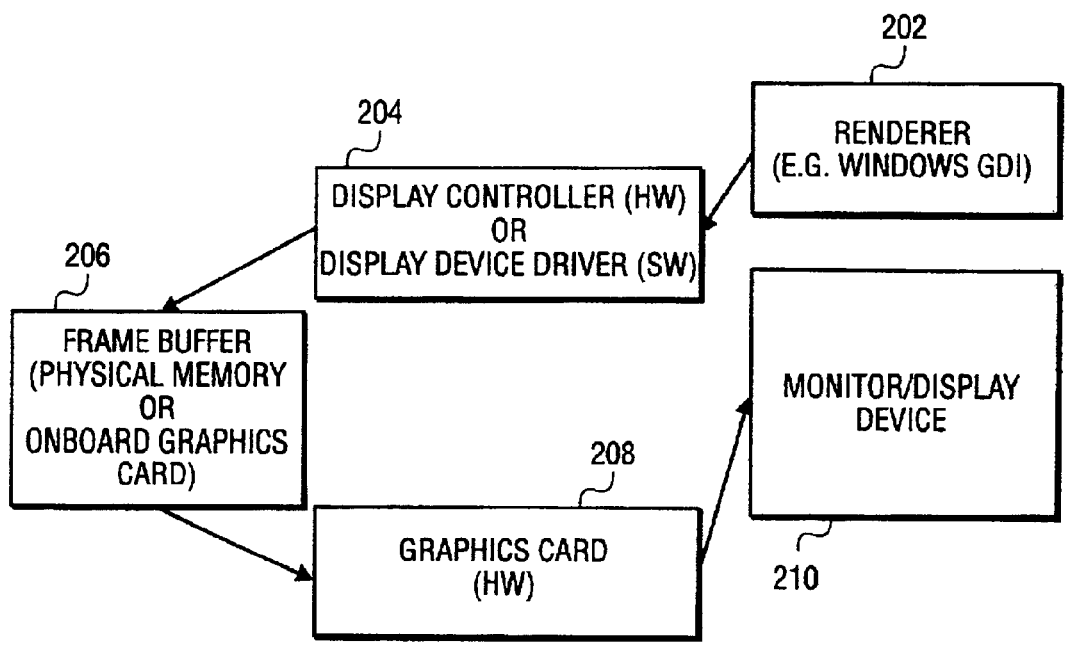
FIG. 3 illustrates a block diagram of an embodiment of a graphics pipeline including implementation of the color corrected graphics at the render and raster stages.

FIG. 3 illustrates a block diagram of an embodiment 200 of a graphics pipeline including implementation of the color corrected graphics at the render and raster stage. Rendering is considered to be the entire process of taking models (usually 3D although could be 2D), performing lighting, viewing, clipping, composition and other activities to arrive at a final 2D image. Rasterization, or Rastering, is considered to be a single stage process of determining a set of pixels values (based upon a current display mode color depth, etc.), for display on the screen. Rendering is typically a multi-stage process, whereas rasterization is typically a one-stage process. The result of a rendering pipeline is fed into the raster for display. Modern computer monitors are commonly called "raster display devices" for this reason—they display information on screen via a set of bytes that represent a series of pixels. This set of pixels is often called the refresh buffer, or more commonly the frame buffer. Pixels in the frame buffer are piped to the raster display (e.g. your monitor). For a very simple display that was just a single bit-mapped image, there is no rendering. The graphics engine simply rasters (i.e. BitBlt's) the image into the graphics card frame buffer, or directly to the display.

The color-blind filter can be implemented anywhere along the graphics pipeline. For example, as discussed in detail below, in one embodiment, a rendering engine 202 generates graphics data based upon the geometric primitives and associated rendering commands. A color-blind analyzer, implemented via display controller or display device driver 204, in communication with the rendering engine 202 analyzes graphics data generated by the rendering engine 202 and modifies selected graphics data into color corrected data suitable for a visually challenged viewer. The rendering engine 202 then concludes rendering of the color corrected data into a color corrected image for further processing 206, 208 and display 210.

As discussed in detail below, in another embodiment, at the raster stage 206, a scan-convert processor converts the geometric primitives to produce rasterized pixel data including color data for pixel locations in the image. A private memory area separate from the frame buffer stores the rasterized pixel data. A color-blind analyzer in communication with the private memory area analyzes the rasterized pixel data stored in the private memory area and modifies selected rasterized pixel data into color corrected pixel data for further processing 206, 208 and display 210.

Color Blind Modification Implemented at Render Stage

Figure 4:
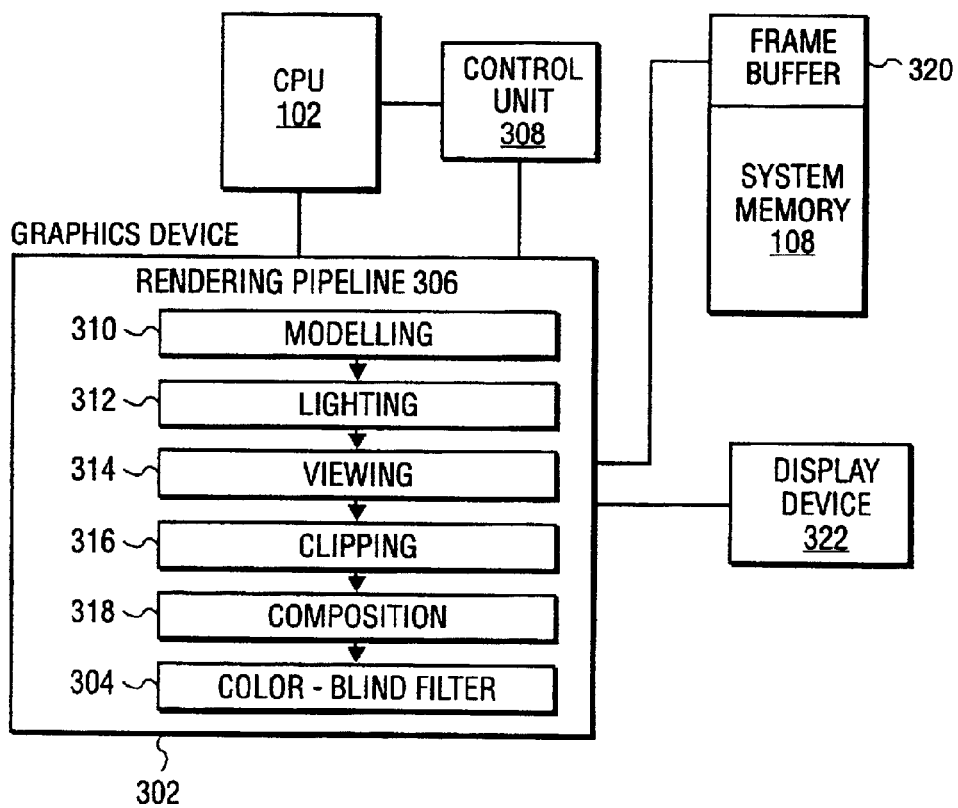
FIG. 4 illustrates a block diagram of an embodiment of a graphics device including a color blind filter implemented in the render stage.

FIG. 4 illustrates a block diagram of an embodiment 300 of a graphics device 302 including a color-blind filter 304 implemented in the render stage 306. Referring to FIG. 3, color-blind modification is implemented at the render stage of the graphics pipeline prior to rasterization of the image into the frame buffer. Rendering is the process of generating two-dimensional images of data for display on a monitor. Typically, rendering includes processing geometric primitives (e.g., points, lines and polygons) to determine component pixel values for the monitor display, a process often referred to specifically as rasterization.

In particular, referring to FIG. 4, a control unit 308 supervises the operation of the graphics device 302. Upon receiving a graphics order to render a scene, the control unit 308 passes the graphics data associated with the graphics order on to a rendering pipeline 306. The rendering pipeline 306 transforms the graphics data associated with the graphics order from the model coordinate system to a normalized device coordinate system designated the view coordinate system and clips the graphics data against a predetermined view volume. In addition, depending upon the shading algorithm to be applied, an illumination model is evaluated at various locations (i.e. the vertices of the primitives and/or the pixels covered by a given primitive). The transformed and clipped graphics data is then passed on to a rasterization stage 308 that converts the transformed primitives into pixels, and generally stores each primitive's contribution at each pixel. One skilled in the art will recognize that the rendering pipeline 306 may be organized in a variety of architectures and is not limited to the configuration described herein. The present invention provides a color correction mechanism with perspective correction that may be integrated into any stage of the rendering pipeline 306. For the sake of description, an example of a common graphics pipeline is set forth below.

More specifically, as shown in FIG. 4, a common rendering pipeline 306 includes multiple stages, typically including one or more of the following: modeling 310, lighting 312, viewing 314, clipping 316, composition 318 and other stages.

During or before the graphics content is rendered and prior to rasterization, graphics content, including but not limited to, images, constructs and shapes are analyzed to determine if there is any content (e.g. colors) that would be problematic for persons with color blindness. If any content is found to be problematic for color-blind users, the contents' properties (or individual pixels if at the raster stage) are modified to reflect adjusted color or pattern shapes that are suitable for color-blind users. For example, analysis of shade properties could indicate a grouping of two or more distinct colors arranged such that a color-bind person would be unable to detect the presence of two separate shades, and would instead see them as just one flat color. Embodiments of the present invention, upon detecting this pattern, would modify one or more of the colors to some other color that will provide contrast to the other shades, allowing the color-blind person to see the distinct color shades, where before there was but one prior to modification.

If the original models contain complex color information suitable for modification, colors within a specific color blind range can be modified in the original model itself. Note that this process would probably best be performed after lighting, viewing, and composition are performed, as these stages may change the color properties of 3D models. One skilled in the art will recognize that color-blind modification can be performed prior to any one of these stages.

Additionally, in another embodiment, stock images, textures, or geometric shapes stored by application programs, as part of graphics libraries, or as part of the graphics subsystem itself could be modified per this invention earlier in the graphics pipeline (i.e. before pixel rasterization) using the same or similar methods. For example, a JPEG image texture used in an application could be analyzed to determine if any pixel color patterns would obscure different shades of colors to the color-blind person. If such patterns are found, the individual image pixels could be modified so that when used in the future (e.g. as a texture), the analysis and modification had already been performed.

For example, in a Windows-based operating system, the present invention may be implemented in the Graphics Display Interface (GDI) subsystem, some combinations of the GDI and graphics card device driver, or completely in the graphics device driver. The present invention could also be implemented in a graphics card that facilitates or has rendering capability. In graphics cards with rendering capability, the color-blind modifications can be executed internally on the graphics card.

Figure 5A:
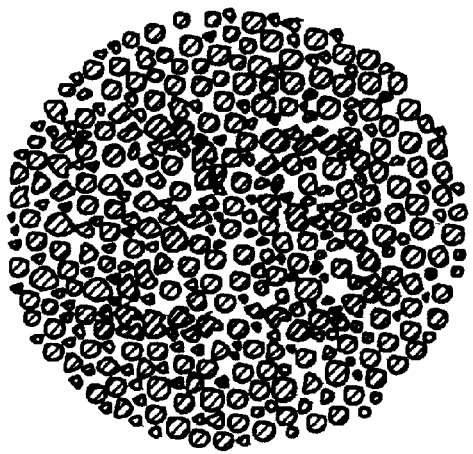
FIG. 5(a) illustrates a non-color corrected image as seen by a color-blind user.
Figure 5B:
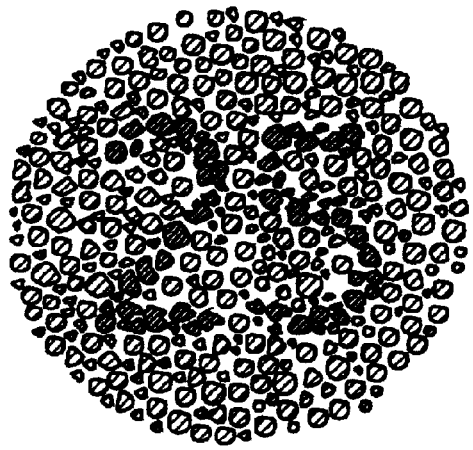
FIG. 5(b) illustrates a color-corrected image as seen by a color-blind user.
Figure 5C:
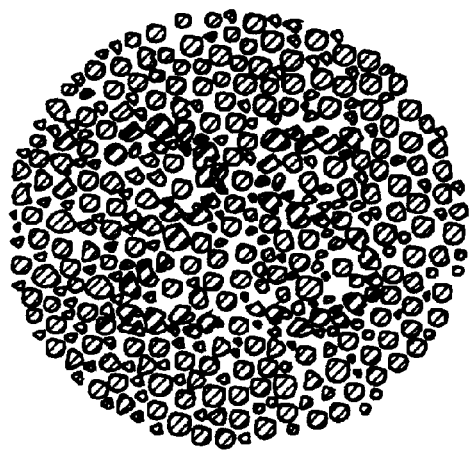
FIG. 5(c) illustrates a color-corrected generated by overlaying a pattern on top of a difficult to see color.

Referring to FIGS. 5(a)–(c), the following images result from graphics operands may be contained in either system memory or local memory to facilitate the color-blind modification process: a rendering operand that contains data forming a newly created 2D object 400 (could also be used to create a 3D object) (FIG. 5(a)), a modification operand to analyze and modify the date if the color-blind filter is triggered by a user, a color modification operand 402 that is used to provide an alternative stream of graphics color data instead of the data problematic to a color-blind user (FIG. 5(b)), an overlay operand 404 that is used to provide an alternative stream of graphics data instead of the data problematic to a color-blind user (FIG. 5(c)), and a display operand that contains data used for displaying the modified 3D object. It is contemplated that other operands may be contained in system memory or local memory for color-blind modification such as commands and the like.

Figure 6:
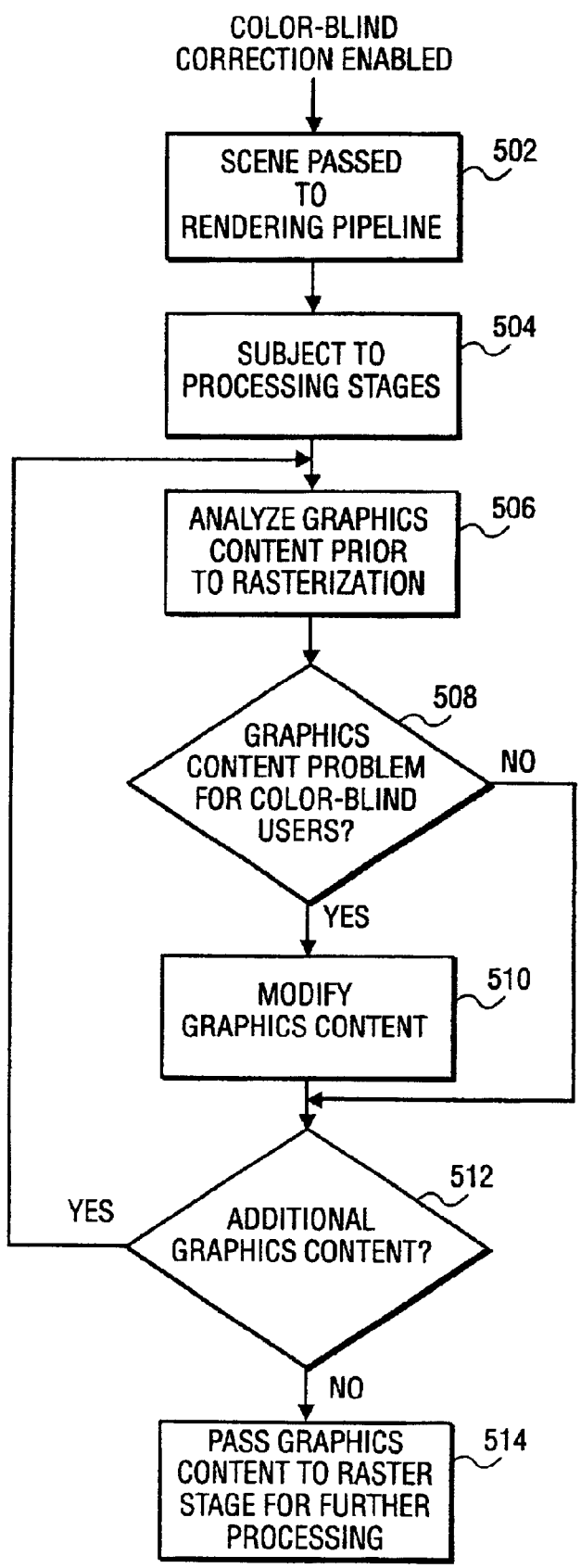
FIG. 6 illustrates a flow diagram of an embodiment of a process for providing color corrected graphics for color-blind users implemented at the render stage.

Thus, according to the present invention, an efficient color correction mechanism is provided that may be integrated into the rendering pipeline of FIG. 4, or may be integrated into other rendering architectures. FIG. 6 illustrates a flow diagram of an embodiment 500 of a process for providing color corrected graphics for color-blind users implemented at the render stage. Assuming the color-blind filter of the present invention is set as a default state or enabled by a user, the scene is passed to a rendering pipeline (step 502) where it is subjected to various processing stages (step 504), including one or more of the following: modeling, lighting, viewing, clipping, composition and other stages. During or before the graphics content is rendered and prior to rasterization, the graphics content is analyzed to determine if there is any content that would be problematic to a color-blind user (step 506). If the content is not problematic for color-blind users (step 508), no modifications are made to the graphics content. If the content is problematic for color-blind users (step 508), the appropriate changes are made (step 510). Steps 506–510 are repeated until all of the graphics content is analyzed (step 512). The graphics content is then passed to the raster stage for further processing and display (step 514).

Color Blind Filter Implemented at Rasterization

Figure 7:
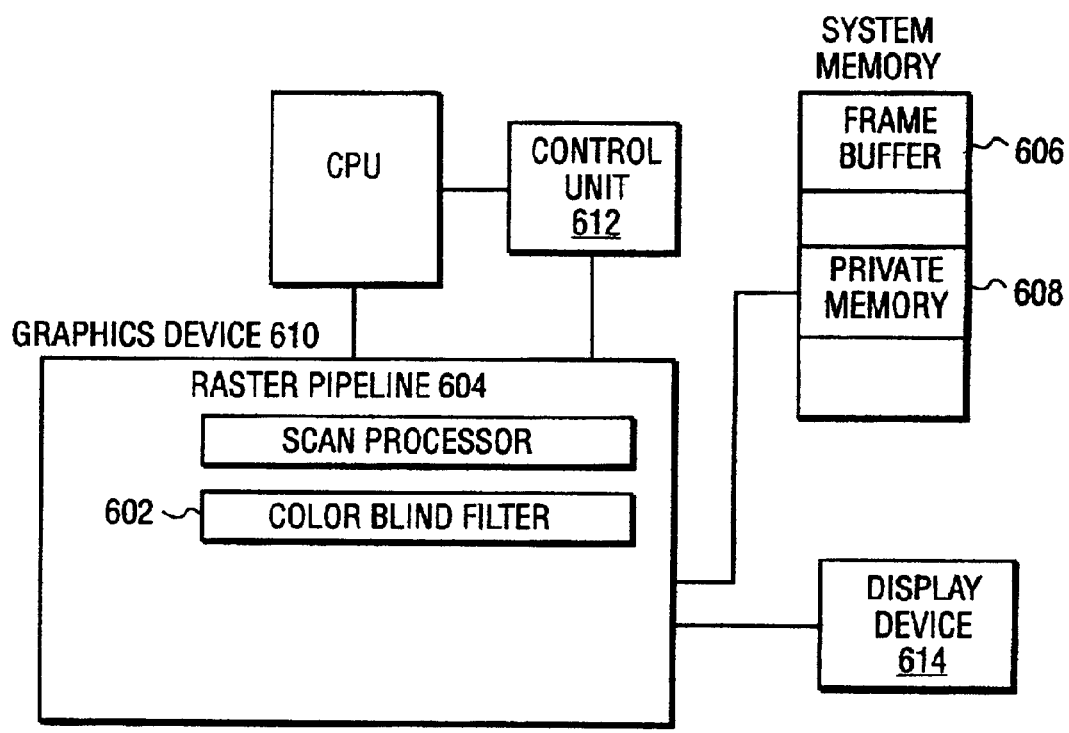
FIG. 7 illustrates a block diagram of an embodiment of a graphics device including a color blind filter implemented in the raster stage.

FIG. 7 illustrates a block diagram of an embodiment 600 of a graphics device 610 including a color blind filter 602 implemented in the raster stage 604 of the graphics pipeline prior to the image being displayed 614 to a color-blind user. A control unit 612 supervises the operation of the graphics device 610. During the raster stage 604, graphics content, including but not limited to, images, constructs and shapes are analyzed to determine if there content (e.g. colors) that would be problematic for persons with color blindness. If any content is found to be problematic for color-blind users, the contents' properties are modified to reflect adjusted color or pattern shapes that are suitable for color-blind users.

The color-blind filter for improving or modifying color images according to the invention can be implemented in many ways. One skilled in the art will recognize that the present invention is not limited to a particular implementation. In some cases, simply changing the color can be used to generate an image amenable to a color-blind user. For example, colors that are difficult to for color-blind users to discern, such as red and green, are identified. Graphics content including colors such as red and green are replaced with non-problematic colors. In another embodiment, a pattern is overlaid on top any difficult to see colors to provide an image viewable to a color-blind user. In yet another embodiment, graphics content is enhanced with underlined text or a black outline. Furthermore, colors can be positioned against a background where they can be more visible. If no visibility problems are detected, no modification is made to the graphics content.

In particular, the analysis could be performed as follows: Moving through the from start to finish, take a block of (x1, y1), (x2, y2) pixels and perform per-pixel color analysis to find color patterns in the frame buffer that would affect the color blind person based upon their specific form of color blindness. In each block, the problem pixels are modified either individually (to a neutral color such as white or black), or as an aggregate grouping of pixels (create a new pattern overlaid on top of the problem pixel region). In particular, referring to FIGS. 5(a)–(c), blocks of individual pixels could be analyzed to determine if color patterns would affect the color-blind person based upon their specific form of color blindness. The blocks analyzed are not limited to a particular region or shape. For example, the regions examined could be in any shape, including but not limited to circles, ovals, triangles and so forth.

In another embodiment, any and all pixels that fall within a specific color range (based upon the persons specified form of color blindness) simply be changed to some other neutral color. For example, if shades of the color blue (specified by a range of R,G,B values) are problematic for the color blind user, then all pixels failing within that range of R,G,B values are modified (in this case irrespective of whatever other pixel colors are surrounding them) to some other non-problem color (e.g. white, black, etc.).

Referring now to FIG. 7, an embodiment of frame buffer memory 606 and private area memory 608 is shown. Rastering primitives to generate frame buffer data typically involves dividing the primitive into scan lines, single-pixel thick horizontal or vertical regions of the primitive. Scan lines are also referred to as spans, a term used interchangeably to refer to a scan line or the series of adjacent pixels which make up a scan line. Graphics content may be alternatively located in either of these two memories 606, 608 based upon whether the graphics content needs to be analyzed and modified for color-blind users. If the color-blind filter 602 of the present invention is activated, graphics content may be moved to a private area memory 608 where it is analyzed and modified if needed prior to being made available for further processing and display. Private area memory 608 is preferably static allocated memory, either already on the graphics card, part of the GDI, or memory mapped to system memory. In a typical implementation, the individual rasterized pixels stored in the private memory area 608 are analyzed to determine if any color combinations exist that would be problematic for persons with color blindness. If so, the individual pixel values are modified accordingly, and the now modified set of scan lines in the private memory area 608 is made available for further processing and display. For example, in a software implementation, the modified set of scan lines is made available to the graphics card either by copying into the physical graphics card, or moving into the designated location in frame buffer memory 606. In a hardware implementation, the shape/image modifications are executed on the graphics card. In particular, instead of implementing the present invention using scan-lines, BitBlitting could be used.

Referring to FIGS. 5(a)–(c), the following images result from graphics operands may be contained in private area memory 608 to facilitate the color-blind modification process: a raster operand that contains data forming a newly created 2D object 400 (could also be used to create a 3D object) (FIG. 5(a)), a modification operand to analyze and modify the date if the color-blind filter is triggered by a user, a color modification operand 402 that is used to provide an alternative stream of graphics color data instead of the data problematic to a color-blind user (FIG. 5(b)), and an overlay operand 404 that is used to provide an alternative stream of graphics data instead of the data problematic to a color-blind user (FIG. 5(c)). It is contemplated that other operands may be contained in private area memory for color-blind modification such as commands and the like.

Thereafter, the graphics controller processes the three-dimensional color corrected image to be displayed. In a software implementation, during this processing stage, the color corrected graphics content is transferred to the graphics card either by copying into the physical graphics card, or moving into the designated location in system memory. In a hardware implementation, the shape/image modifications are executed on the graphics card.

Figure 8:
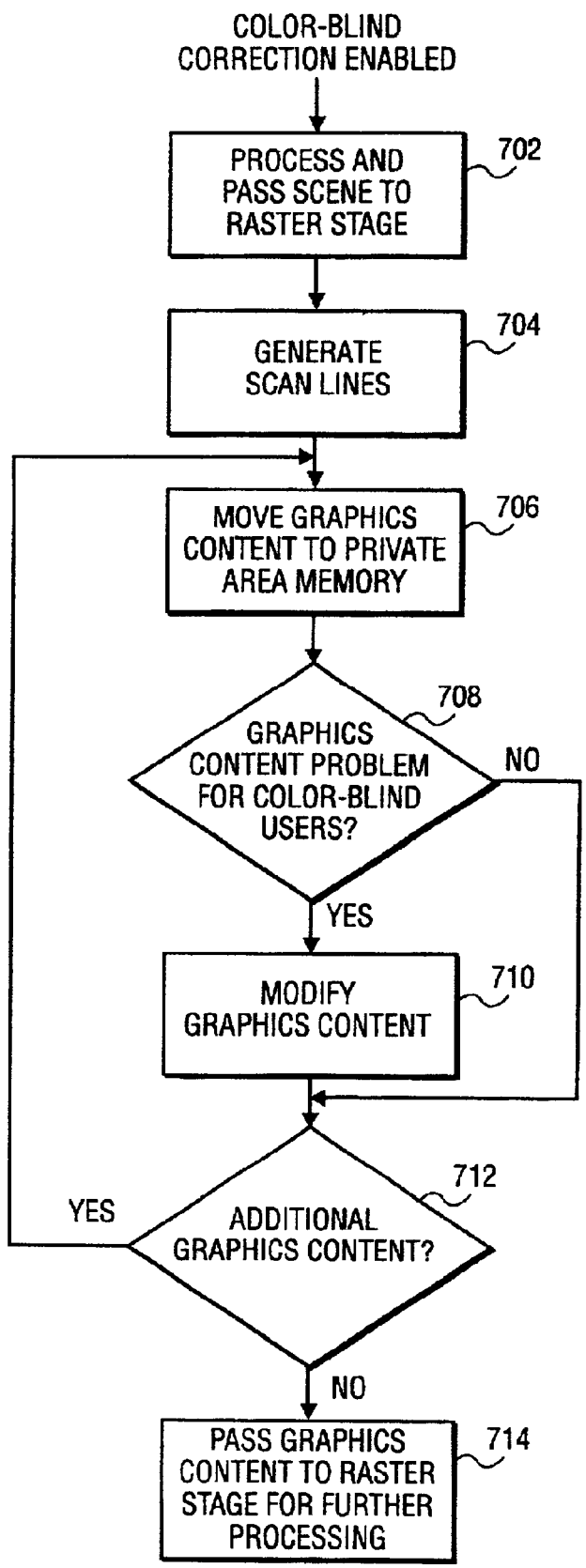
FIG. 8 illustrates a flow diagram of an embodiment of a process for providing color corrected graphics for color-blind users implemented at the raster stage.

FIG. 8 illustrates a flow diagram of an embodiment 700 of a process for providing color corrected graphics for color-blind users implemented at the raster stage. Assuming the color blind filter of the present invention is set as a default state or enabled by a user, the scene is passed from the rendering stage to the rasterization stage (step 702). Scan lines are generated based upon the graphics content received (step 704). The graphics content is moved to a private area memory (step 706) and analyzed to determine if there is any content that would be problematic to a color-blind user (step 708). If the content is not problematic for color-blind users (step 708), no modifications are made to the graphics content and it is made available for further processing and display (step 714) if there is no further graphics content to be processed (step 714). If the content is problematic for color-blind users (step 708), appropriate changes are made (step 710). Steps 708–710 are repeated until all of the graphics content is analyzed (step 712). The graphics content is then made available for further processing and display (step 714).

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A system for generating a color corrected image, comprising:

a setup engine to receive and parse geometric primitives and associated rendering commands;

a rendering engine to generate graphics data based upon the geometric primitives and associated rendering commands; and a color-blind analyzer to analyze graphics data generated by the rendering engine and modify selected graphics data into color corrected data by overlaying a pattern on top of color characteristics problematic for a visually challenged viewer, wherein the rendering engine renders the color corrected data into a color corrected image for further processing and display.

2. The system of claim 1 wherein the color corrected data comprises modified color data.

3. The system of claim 1 wherein the color corrected data comprises modified pattern data.

4. The system of claim 1 wherein the graphics data's color characteristic is modified to a color characteristic suitable for a visually challenged viewer.

5. A system for generating a color corrected image, comprising:

a set-up processor to receive and parse geometric primitives and associated rendering commands;

a scan-convert processor to convert the geometric primitives to produce rasterized pixel data including color data for pixel locations in the image;

a memory area for storing the rasterized pixel data; and a color-blind analyzer in communication with the memory area to analyze the rasterized pixel data stored in the memory area and modify selected rasterized pixel data into color corrected pixel data by overlaying a pattern on top of color characteristics problematic for a visually challenged viewer.

6. The system of claim 5 further comprising:

a second memory area for storing the color corrected pixel data.

7. The system of claim 5 further comprising:

a graphics pixel engine for generating a color corrected image based upon the color corrected pixel data.

8. The system of claim 5 wherein the color corrected pixel data comprises modified pixel color data.

9. The system of claim 5 wherein the color corrected pixel data comprises modified pixel pattern data.

10. The system of claim 5 wherein the rasterized pixel data's color characteristic is adjusted to a color characteristic suitable for a visually challenged viewer.

11. The system of claim 5 wherein the rasterized pixel data's pattern characteristic is adjusted to a pattern characteristic suitable for a visually challenged viewer.

12. A method for generating a color corrected image, comprising:

receiving and parsing geometric primitives and associated rendering commands;

generating graphics data based upon the geometric primitives and associated rendering commands;

analyzing graphics data and modifying selected graphics data into color corrected data by overlaying a pattern on top of color characteristics problematic for a visually challenged viewer; and rendering the color corrected data into a color corrected image for further processing and display.

13. The method of claim 12 wherein the color corrected data comprises modified color data.

14. The method of claim 12 wherein the color corrected data comprises modified pattern data.

15. The method of claim 12 wherein analyzing graphics data and converting selected graphics data into color corrected data suitable for a visually challenged viewer further comprises:
analyzing intermediate graphics data and converting selected intermediate graphics data into color corrected data suitable for a visually challenged viewer.

16. The method of claim 15 wherein analyzing intermediate graphics data and converting selected intermediate graphics data into color corrected data suitable for a visually challenged viewer further comprises:
modifying the intermediate graphics data's color characteristic to a color characteristic suitable for a visually challenged viewer.

17. The method of claim 15 wherein analyzing intermediate graphics data and converting selected intermediate graphics data into color corrected data suitable for a visually challenged viewer further comprises:
modifying the intermediate graphics data's pattern characteristic to a pattern characteristic suitable for a visually challenged viewer.

18. A method for generating a color corrected image, comprising:
receiving and parsing geometric primitives and associated rendering commands;
scan converting the geometric primitives to produce rasterized pixel data including color data for pixel locations in the image;
storing the rasterized pixel data in a first memory area; and
analyzing the rasterized pixel data stored in the memory area and modifying selected rasterized pixel data into color corrected pixel data by overlaying a pattern on top of color characteristics problematic for a visually challenged viewer.

19. The method of claim 18 further comprising:
storing the color corrected pixel data in a second memory area.

20. The method of claim 18 further comprising:
generating a color corrected image based upon the color corrected pixel data.

21. The method of claim 18 wherein the color corrected pixel data comprises modified pixel color data.

22. The method of claim 18 wherein the color corrected pixel data comprises modified pixel pattern data.

23. The method of claim 18 wherein analyzing the rasterized pixel data stored in the memory area and converting selected rasterized pixel data into color corrected pixel data suitable for a visually challenged viewer further comprises:
adjusting the rasterized pixel data's color characteristic to a color characteristic suitable for a visually challenged viewer.

24. The method of claim 18 wherein analyzing the rasterized pixel data stored in the memory area and converting selected rasterized pixel data into color corrected pixel data suitable for a visually challenged viewer further comprises:
adjusting the rasterized pixel data's pattern to a pattern characteristic suitable for a visually challenged viewer.

25. A method for providing graphics content visible to a color challenged user, comprising:
analyzing computer graphics content in accordance with predefined color profiles; modifying graphics content that falls within at least one of the predefined color profiles by overlaying a pattern on top of color characteristics problematic to color challenged users; and
facilitating display of the modified graphics content.

26. A machine readable medium having stored therein a plurality of machine readable instructions executable by a processor to provide graphics content visible to a color challenged user, the machine readable instructions comprising:
instructions to analyze computer graphics content in accordance with predefined color profiles;
instructions to modify graphics content that falls within at least one of the predefined color profiles by overlaying a pattern on top of color characteristics problematic to color challenged users; and
instructions to facilitate display of the modified graphics content.

27. A machine readable medium having stored therein a plurality of machine readable instructions executable by a processor to generate a color corrected image, the machine readable instructions comprising:
instructions to receive and parse geometric primitives and associated rendering commands;
instructions to generate graphics data based upon the geometric primitives and associated rendering commands;
instructions to analyze graphics data and modify selected graphics data into color corrected data by overlaying a pattern on top of color characteristics problematic for a visually challenged viewer; and
instructions to render the color corrected data into a color corrected image for further processing and display.

28. The machine readable medium of claim 27 wherein the color corrected data comprises modified color data.

29. The machine readable medium of claim 27 wherein the color corrected data comprises modified pattern data.

30. The machine readable medium of claim 27 wherein instructions to analyze graphics data and convert selected graphics data into color corrected data suitable for a visually challenged viewer further comprises:
instructions to analyze intermediate graphics data and convert selected intermediate graphics data into color corrected data suitable for a visually challenged viewer.

31. The machine readable medium of claim 30 wherein instructions to analyze intermediate graphics data and convert selected intermediate graphics data into color corrected data suitable for a visually challenged viewer further comprises:
instructions to modify the intermediate graphics data's color characteristic to a color characteristic suitable for a visually challenged viewer.

32. The machine readable medium of claim 30 wherein instructions to analyze intermediate graphics data and convert selected intermediate graphics data into color corrected data suitable for a visually challenged viewer further comprises:
instructions to modify the intermediate graphics data's pattern characteristic to a pattern characteristic suitable for a visually challenged viewer.

33. A machine readable medium having stored therein a plurality of machine readable instructions executable by a processor to generate a color corrected image, machine readable instructions comprising:
instructions to receive and parse geometric primitives and associated rendering commands;
instructions to scan convert the geometric primitives to produce rasterized pixel data including color data for pixel locations in the image;

instructions to analyze the rasterized pixel data stored in the memory area and modify selected rasterized pixel data into color corrected pixel data by overlaying a pattern on top of color characteristics problematic for a visually challenged viewer.

34. The machine readable medium of claim 33 further comprising:

instructions to store the color corrected pixel data in a second memory area.

35. The machine readable medium of claim 33 further comprising:

instructions to generate a color corrected image based upon the color corrected pixel data.

36. The machine readable medium of claim 33 wherein the color corrected pixel data comprises modified pixel color data.

37. The machine readable medium of claim 33 wherein the color corrected pixel data comprises modified pixel pattern data.

38. The machine readable medium of claim 33 wherein instructions to analyze the rasterized pixel data stored in the memory area and convert selected rasterized pixel data into color corrected pixel data suitable for a visually challenged viewer further comprises:

instructions to adjust the rasterized pixel data's color characteristic to a color characteristic suitable for a visually challenged viewer.

39. The machine readable medium of claim 33 wherein instructions to analyze the rasterized pixel data stored in the memory area and convert selected rasterized pixel data into color corrected pixel data suitable for a visually challenged viewer further comprises:

instructions to adjust the rasterized pixel data's pattern to a pattern characteristic suitable for a visually challenged viewer.

* * * * *